Aug. 5, 1924.

G. R. WEED

EYE SCREEN

Filed Aug. 14, 1922

1,503,868

Inventor,
Gustavus R. Weed.
Lawrence S. Paddock
Attorney.

Patented Aug. 5, 1924.

1,503,868

UNITED STATES PATENT OFFICE.

GUSTAVUS R. WEED, OF EAST ORANGE, NEW JERSEY.

EYE SCREEN.

Application filed August 14, 1922. Serial No. 581,796.

*To all whom it may concern:*

Be it known that I, GUSTAVUS R. WEED, a citizen of the United States, residing at East Orange, New Jersey, have invented a new and useful Improvement in Eye Screens, of which the following is a specification.

My invention relates broadly to eye shields and is especially adapted to protect the eyes of the drivers of automobiles or pedestrians from the blinding effect of the lights of automobiles at night.

An object of my invention is to provide an eye shield which may be worn by the user in a manner similar to the usual form of spectacles and carried in a pocket case with the same convenience.

Another object is to provide an eye shield which will allow a clear line of vision when the head of the user is in the normal elevated position and which may be brought across the line of vision by a slight inclination of the head.

Another object is to provide an eye shield which may be easily adjusted so as to be supported in the proper position before the eyes of the user.

Other objects will appear hereinafter in the detailed description.

Figure 1:
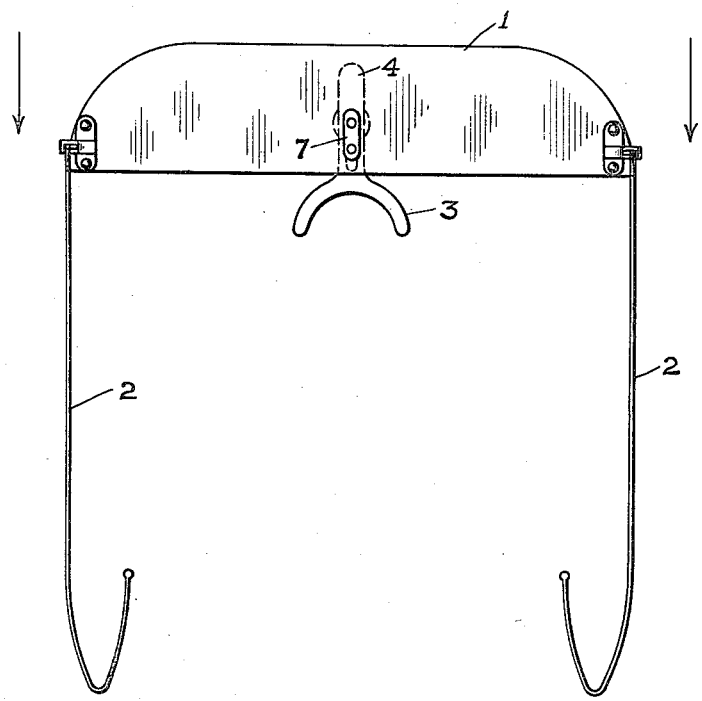
Figure 2:
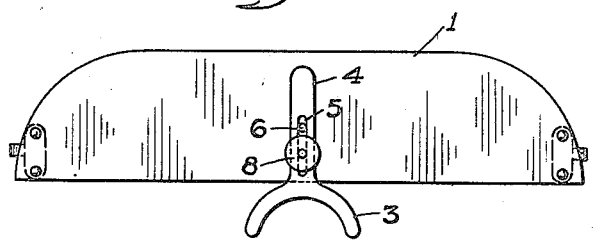

In the drawings Fig. 1 is a side view of an embodiment of my invention. Fig. 2 is a side view of the same looking in the direction of the arrows in Fig. 1.

In the drawings 1 is a translucent screen which is preferably composed of a light material such as celluloid of such a color as will protect the eyes from the blinding effect of intense light. Green is a very satisfactory color for this purpose. 2 are flexible bows adapted to pass over and rest on the ears of the user and are pivotally attached to the screen 1 as shown. 3 is an adjustable nose piece having an extension 4. The extension 4 is provided with a slot 5. A guide pin 6 is positioned in the screen 1 and projects through the slot 5 which serves as a guide for the extension 4 of the adjustable nose piece. A clamping member 7 is positioned in the screen 1 and has a threaded shank which extends thru the slot 5 and is provided at its outer end with a clamping nut 8.

By the construction thus described the nose piece 3 may be vertically adjusted to the desired position and held in place by tightening the clamping nut 8 against the extension 4. The translucent screen 1 is of such a form that when adjusted and the head of the user is in the normal elevated position a clear vision is permitted under it and by a slight downward inclination of the head the screen is brought across the line of vision thus protecting the eyes from the blinding rays from the lights of an approaching automobile.

While my eye screen is of great advantage to the driver of an automobile at night it is also very useful to the pedestrian in a similar manner. By its use the danger of accidents caused by the blinding effect of intense light from the lamps of other automobiles or vehicles is avoided with the resultant comfort and safety.

Having described my invention what I claim is:

1. In an eye screen, a translucent member, an adjustable nose support therefor and a clamping means attached directly to said translucent member adapted to clamp said nose piece on said translucent member.

2. In an eye screen, a translucent member, a nose support therefor having an extension thereon with a slot therein, a clamping member supported in said translucent member having a projection passing through said slot and a compression member on said projection adapted to hold said extension in adjusted position against said translucent member.

3. In an eye screen, a translucent member, a nose support therefor having an extension thereon with a slot therein, a clamping member supported in said translucent member having a projection passing through said slot, a guide pin supported in said translucent member and passing thru said slot and a compression member on said projection adapted to hold said extension in adjusted position against said translucent member.

4. An eye screen having a translucent member formed with a curved upper edge and a straight lower edge and an adjustable nose support therefor adapted to support said translucent member in such a position as to permit an unobstructed line of vision under said straight lower edge when the user's head is in normal position and be brought across the line of vision by a downward inclination of the head said support having a central extension thereon and means on said screen for adjustably gripping said extension and holding said support in the desired position.

5. In an eye screen, in combination, a translucent member and a vertically adjustable nose piece extending downwardly from said member so as to project below the same and adapted to support said member above the ordinary line of vision.

6. In an eye screen, in combination, a translucent member, a nose piece provided with an extension thereon and a clamping member attached directly to said translucent member and adjustably attached to said extension.

7. In an eye screen, in combination, a translucent member, a nose piece provided with an extension thereon and having a vertical slot therein, a clamping member attached directly to said translucent member having a shank passing through said slot and a compression member on said shank adapted to hold said extension in adjusted position on said translucent member.

In testimony whereof, I have signed my name to this specification in the presence of two subscribing witnesses, this seventh day of August, 1922.

GUSTAVUS R. WEED.

Witnesses:
CHAS. W. NORTON,
JOHN W. WEED.